United States Patent [19]

Denis et al.

[11] Patent Number: 5,763,860
[45] Date of Patent: Jun. 9, 1998

[54] GESTATIONAL CALCULATOR

[76] Inventors: Diane T. Denis, 96 W. 18th St., Deer Park, Long Island, N.Y. 11729; Geraldine M. Friedlander, 3 Ethan Cir., Middle Island, N.Y. 11953

[21] Appl. No.: 762,711

[22] Filed: Dec. 10, 1996

[51] Int. Cl.⁶ .................................. G06C 27/00
[52] U.S. Cl. ........................................ 235/78 R
[58] Field of Search ................. 235/70 B, 78 R, 235/78 M, 83, 84, 85 R, 88 R, 88 M; 600/300, 551

[56] References Cited

U.S. PATENT DOCUMENTS

| | | | |
|---|---|---|---|
| D. 258,893 | 4/1981 | McCrae | D18/7 |
| 4,005,571 | 2/1977 | Wolff | 58/39.5 |
| 4,101,962 | 7/1978 | Hakata | 364/413 |
| 4,133,476 | 1/1979 | Poage et al. | 235/85 FC |
| 4,233,665 | 11/1980 | Maehashi et al. | 364/715 |
| 4,276,606 | 6/1981 | Harigaya et al. | 364/709 |
| 4,443,851 | 4/1984 | Lin | 364/415 |
| 4,465,077 | 8/1984 | Schneider | 128/738 |
| 4,493,043 | 1/1985 | Forbath | 364/569 |
| 4,527,906 | 7/1985 | Jezbera | 368/107 |
| 4,751,373 | 6/1988 | Ivey | 235/84 |
| 4,752,674 | 6/1988 | Rosenwaks | 235/88 RC |
| 5,031,161 | 7/1991 | Kendrick | 368/280 |
| 5,327,403 | 7/1994 | Bond | 368/107 |
| 5,450,857 | 9/1995 | Garfield et al. | 128/778 |
| 5,492,940 | 2/1996 | Edwards | 521/121 |
| 5,496,070 | 3/1996 | Thompson | 283/2 |
| 5,626,133 | 5/1997 | Johnson et al. | 128/630 |

*Primary Examiner*—Adolf Berhane
*Attorney, Agent, or Firm*—Fish & Richardson P.C

[57] ABSTRACT

A pocket-sized, electronic gestational calculator includes a housing sized and shaped to fit into a user's pocket, an input device connected to the housing and configured to produce signals in response to actuation of the input device by the user, an electronic processor positioned in the housing and configured to receive the signals from the input device and to process the signals to produce gestational information, and a display connected to the housing and configured to display the gestational information produced by the electronic processor. Gestational information produced and displayed includes the expected due date and the gestational age in weeks, months and trimesters.

20 Claims, 4 Drawing Sheets

FIG. 4

GESTATIONAL CALCULATOR

BACKGROUND OF THE INVENTION

The invention is directed to determining gestational information.

Gestational information includes, for example, the expected date of confinement (i.e., the due date) and the gestational age (i.e., the current week or month of the pregnancy). When a baby is expected, gestational information is vital to the expectant parents and to the health-care professional. The gestational age informs the expectant parents and the health-care professional about the developmental status of the fetus. Knowledge of the due date enables all parties to prepare for the arrival.

It is known to determine the due date and the gestational age using a device commonly referred to as "the wheel". As shown in FIG. 5, the device 1000 includes a sheet 1005 of plastic or other stiff material on which is printed an annular calendar 1010. A rotatable wheel 1015 is attached to the sheet 1005 by a rivet 1020. The wheel 1015 is marked with numbered increments corresponding to weeks 1025, months 1030 and trimesters 1035. These increments are sized to correspond to sizes of the respective units on the calendar 1010. The week count starts with a label 1040 identifying the first day of the mother-to-be's last menstrual period. A second label 1045 at the second week identifies the date of probable ovulation, while a third label 1050 at the third week identifies the date of probable implantation. Finally, a label 1055 at the fortieth week identifies the expected date of confinement.

The device 1000 is operated by rotating the wheel 1015 so that the label 1040 is aligned with the date corresponding to the first day of the last period. Thereafter, the expected date of confinement may be determined as the date aligned with the label 1055. Similarly, the gestational age may be determined by reference to the week or month aligned with the current date.

SUMMARY OF THE INVENTION

In general, the invention features a pocket-sized, electronic gestational calculator. The calculator includes a housing sized and shaped to fit into a user's pocket. An input device (e.g., a set of keys) is connected to the housing and is configured to produce signals in response to actuation by the user. An electronic processor is positioned in the housing and configured to receive the signals from the input device and to process the signals to produce gestational information. Finally, a display is connected to the housing and configured to display the gestational information produced by the electronic processor.

Embodiments of the invention may include one or more of the following features. The input device may be configured to produce signals corresponding to an initial date that corresponds to a first day of a mother-to-be's last menstrual period. The electronic processor may be configured to determine the mother-to-be's expected due date based on the initial date and to produce the due date for display. For example, the input device may include a key corresponding to the initial date for use in indicating that signals correspond to the initial date and a set of numeric keys for use in identifying the initial date.

The input device also may be configured to produce signals corresponding to a current date. The electronic processor may be configured to determine a gestational age based on the initial date and the current date and to produce the gestational age for display. Gestational age may be determined and displayed in units of weeks, months or trimesters. The input device may include keys corresponding to the current date and the gestational age.

The electronic calculator may include a memory positioned in the housing. The memory may be configured to store the current date, the initial date, the expected due date, and the gestational age.

The input device also may be configured to produce signals corresponding to an expected due date. For example, the input device may include a key corresponding to the expected due date for this purpose. In this instance, the electronic processor may be configured to determine the initial date based on the expected due date provided using the input device. When the input device includes keys corresponding to the initial date, the expected due date, the gestational age or the current date, the processor and the display may be configured to display each of these items in response to actuation of the corresponding key.

The gestational calculator of the invention promises to provide information quickly and accurately with little effort by the user. A large display makes the gestational calculator easy to read while a simple and intuitive interface makes the gestational calculator easy to use. In addition, the gestational calculator is sized to be portable and convenient to carry. Health care professionals such as obstetricians, gynecologists, midwives, nurses, medical students, radiologists, residents and physician's assistants, as well as patients, will benefit from use of the gestational calculator. The gestational calculator also is a low cost device.

Other features and advantages will become apparent from the following description, including the drawings, and from the claims.

DESCRIPTION OF THE PREFERRED EMBODIMENTS

Figure 1:
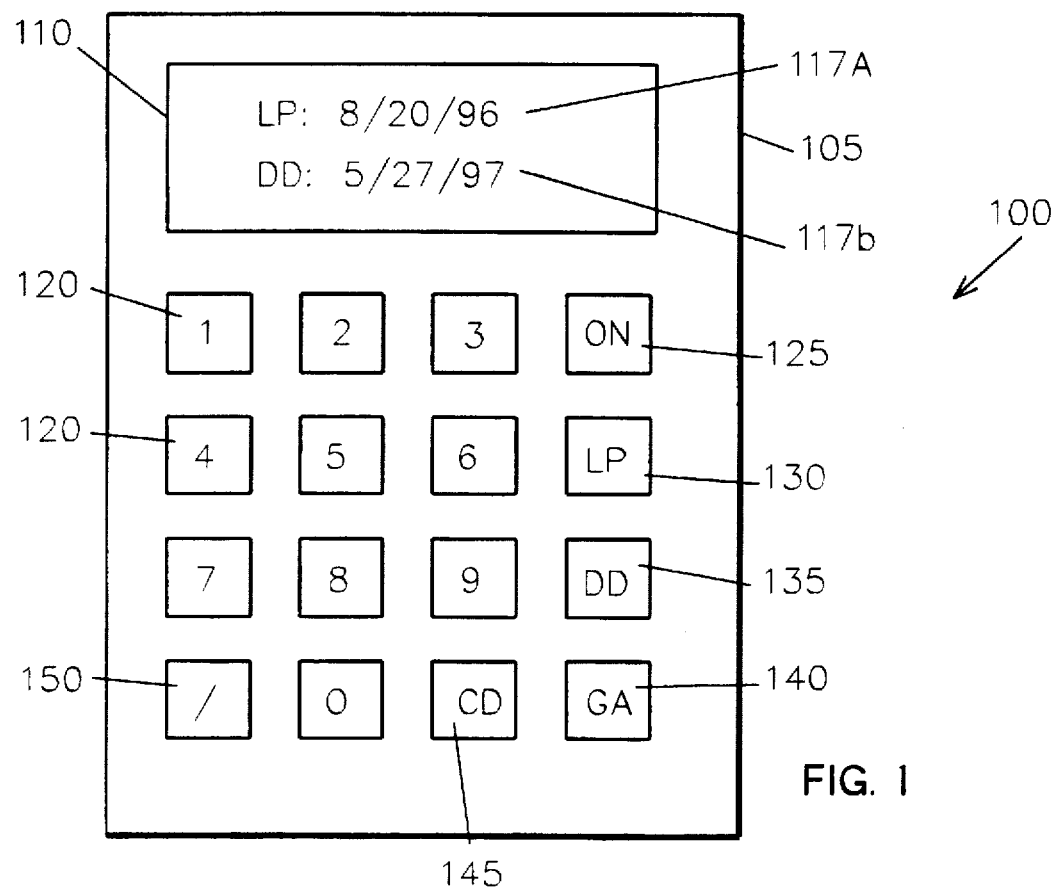
FIG. 1 is a plan view of a gestational calculator.
Figure 2:
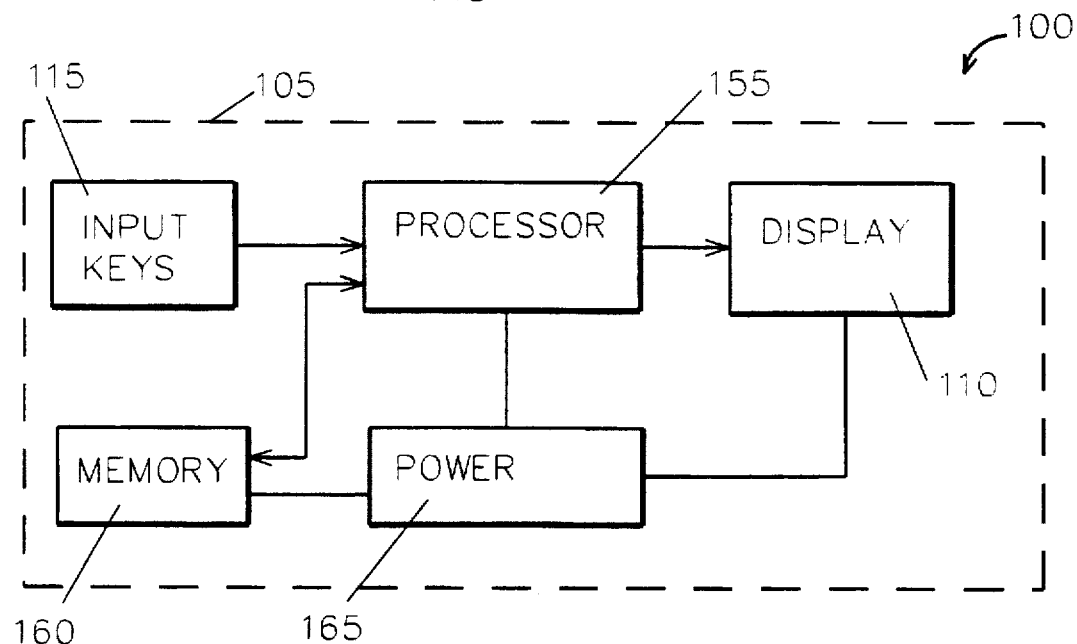
FIG. 2 is a block diagram of the gestational calculator of FIG. 1.

Referring to FIGS. 1 and 2, a gestational calculator 100 includes a housing 105 that is sized to fit within a user's pocket. For example, in one embodiment, the housing 105 is about four and one half inches long, two and one half inches wide, and one quarter inch thick. The front of the housing includes a display 110 and a set of input keys 115. The display 110 includes two display fields 117. In FIG. 1, the first display field 117a displays the first day of the last period (designated by "LP:") as being Aug. 20, 1996, while the second display field 117b displays the expected due date (designated by "DD:") as being May 27, 1997.

The set of input keys 115 includes ten numerical keys 120, an "ON" key 125 that activates the calculator, an "LP" key 130 used in entering or requesting display of the first day of the last period, a "DD" key 135 used in entering or requesting display of the due date, a "GA" key 140 used in entering or requesting display of the gestational age, a "CD" key 145 used in entering or requesting display of the current date, and a "/" key 150 used in entering dates. The back of the housing (not shown) includes information about fetal development. This information may take the form of a removable plastic card on which is also printed the calendar for the current year.

As shown in FIG. 2, the calculator 100 also includes a processor 155, a memory 160 and a power supply 165 that are all positioned within the housing 105. The processor 155 is configured to receive signals from the set of input keys 115 and from the memory 160, and to provide signals to the memory 160 and the display 110. The power supply 165, which may be, for example, a battery or a solar cell, provides power to the processor 155, the memory 160, and the display 110.

Figure 3:
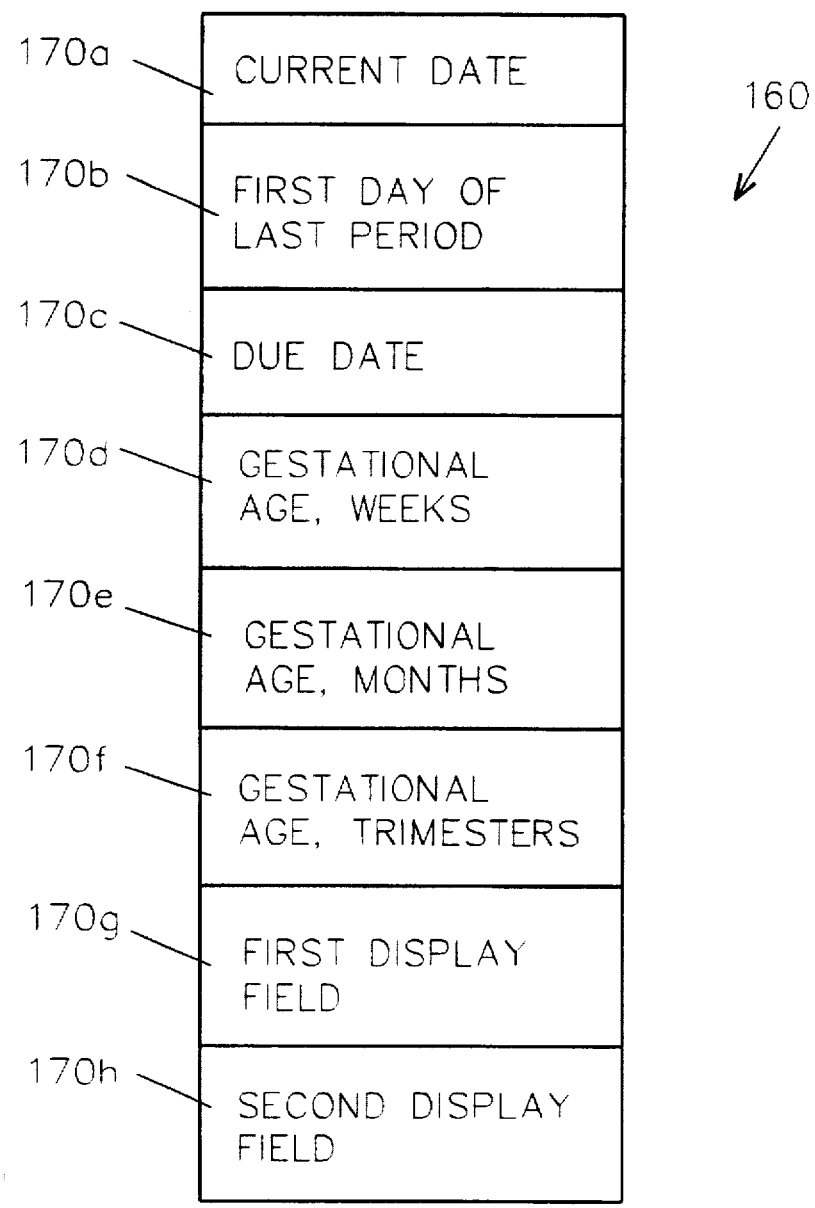
FIG. 3 is a block diagram of a memory of the gestational calculator of FIG. 1.

Referring to FIG. 3, the memory 160 includes entries 170 corresponding to the current date (170a), the first day of the last period (170b), the due date (170c) and the gestational age in weeks (170d), months (170e) and trimesters (170f). The memory also includes entries (170g and 170h) that identify the data to be displayed in the display fields 117 of the display 110.

Figure 4:
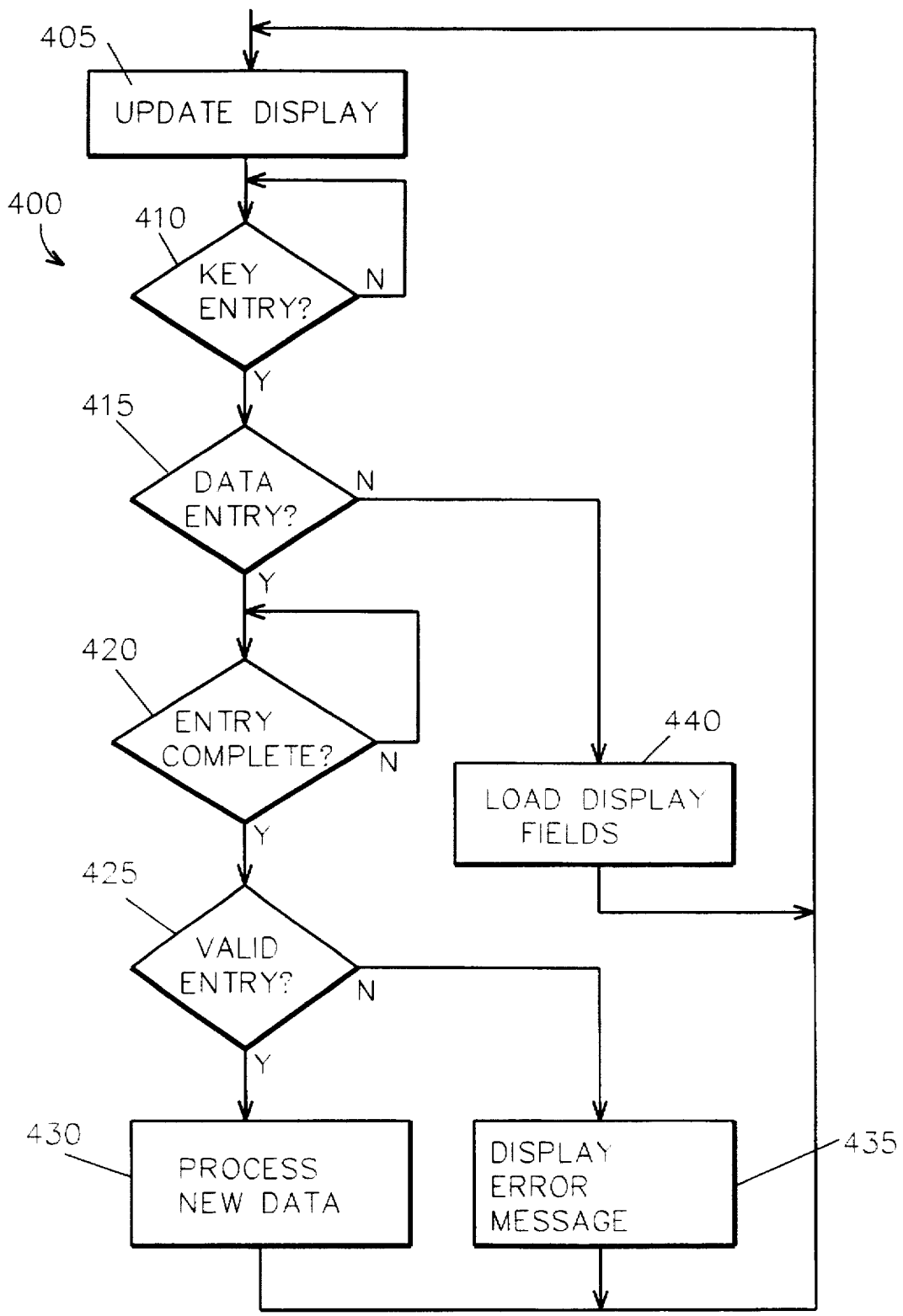
FIG. 4 is a flow chart of a procedure implemented by a processor of the gestational calculator of FIG. 1.
Figure 5:
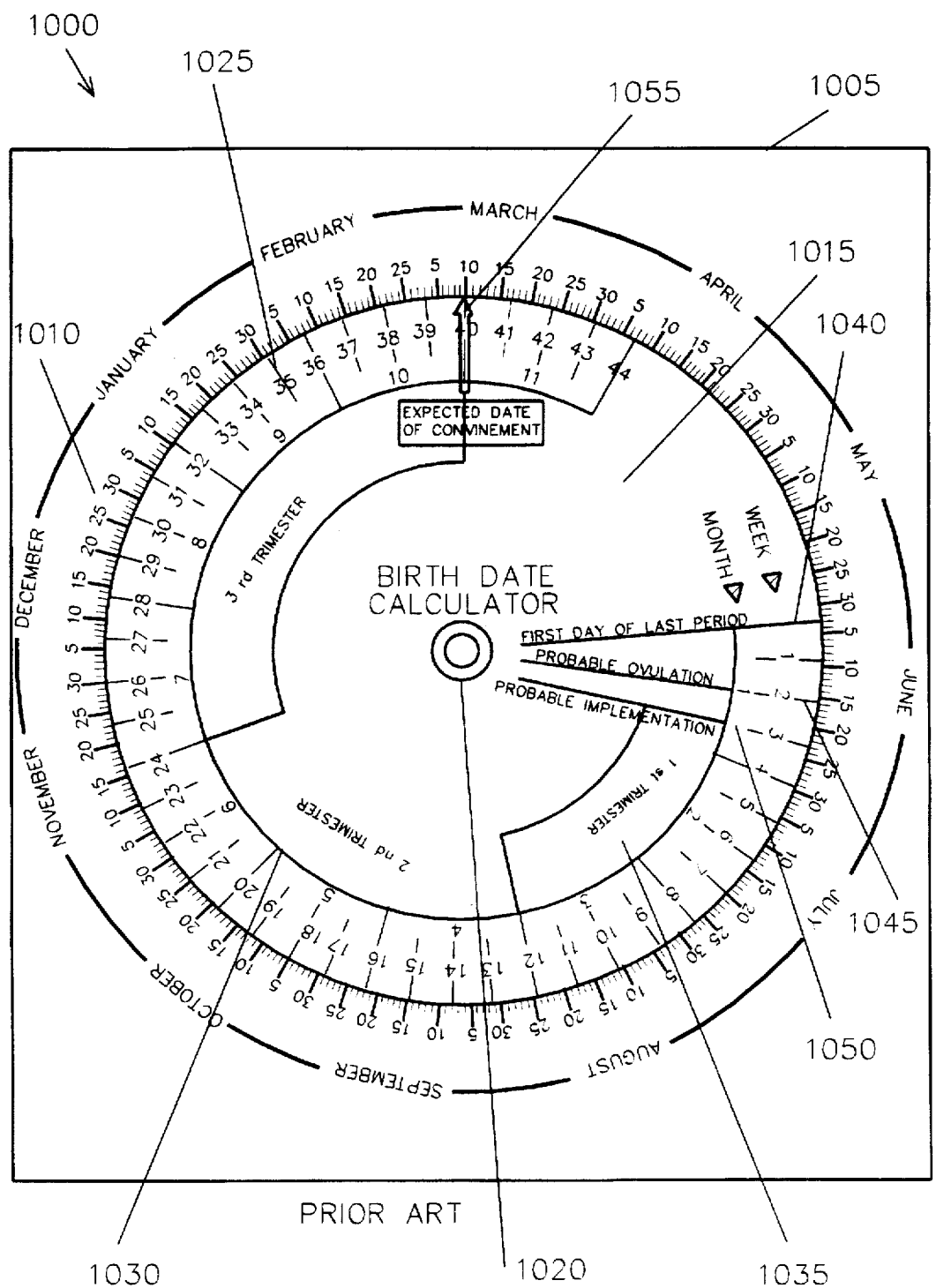
FIG. 5 is a plan view of a mechanical device for determining gestational information.

Referring to FIG. 4, the processor 155 operates the calculator 110 according to a procedure 400. The processor 155 implements the procedure when a user presses the "ON" key 125 to activate the calculator 100.

Initially, the processor 155 updates the display 110 (step 405). The processor does so by determining what data is to be displayed based on the entries 170g and 170h of the memory 160. The processor then retrieves any needed data from the memory 160 and controls the display 110 to display the necessary information.

The processor waits for a key to be pressed (step 410). Though not illustrated in the procedure 400, the processor 155 conserves power by automatically shutting down if no key is pressed for a period of two minutes or more.

When a key is pressed (step 410), the processor determines whether the pressed key is a data entry key (step 415). Data entry keys are the ten numerical keys 120 and the "/" key 150.

If a data entry key has been pressed, the processor processes signals from subsequent keys until a complete entry is received (step 420). The processor assumes that any data being entered corresponds to the item displayed in the first display field 117a. Accordingly, the processor displays in the first display field 117a symbols corresponding to the pressed keys. The processor determines that an entry is complete when sufficient data has been entered. For example, the processor determines that a date entry is complete when the second digit after the second "/" (i.e., the second digit of the year) has been entered. The processor also determines that an entry is complete when a key other than a data entry key is pressed.

Once the data entry is complete, the processor determines whether the data entry is a valid entry (step 425). For example, the processor determines whether a date has been entered in a proper date format and corresponds to an actual date.

If the data entry is valid (step 425), the processor processes the new data (step 430). For example, if the data entry is a new date for the first day of the mother-to-be's last period (entry 170b in memory 160), the processor calculates the due date (entry 170c) as the first day of the last period, plus seven days, plus nine months. Similarly, if the data entry is a due date (entry 170c), the processor calculates the first day of the last period (entry 170b) as seven days and nine months before the due date. Using the current date and the first day of the last period (whether provided as a data entry or newly calculated), the processor calculates the gestational age in weeks (entry 170d), months (entry 170e) and trimesters (entry 170f). The processor also calculates the gestational age entries when the data entry is a new current date. After processing the new data (step 430), the processor updates the display (step 405) and waits for a new key entry (step 410).

If the data entry is not a valid entry (step 425), the processor briefly displays an error message to the user (step 435). Thereafter, the processor updates the display based on the data stored in the memory 160 prior to the erroneous entry (step 405) and waits for a new key entry (step 410).

If a key other than a data entry key is pressed (step 415), the processor, based on the key pressed, updates the entries (170g and 170h) that identify the data to be displayed in the display fields 117 of the display 110 (step 440). If the "LP" key 130, the "DD" key 135, or the "CD" key 145 is pressed, the processor updates the entry 170g to identify the corresponding data (i.e., the first day of the last period, the due date, or the current date) as the data to be displayed in the first display field 117a. If the selected data is not being displayed already in the first display field 117a, then the processor updates the entry 170h to identify the data that currently is being displayed in the first display field 117a as the data to be displayed in the second display field 117b. For example, if the current date was being displayed in the first display field 117a and the due date was being displayed in the second display field 117b, pressing the "LP" key 130 would result in the first day of the last period (entry 170b) being displayed in the first display field 117a and the current date (entry 170a) being displayed in the second display field 117b. If the selected data is being displayed already in the first display field 117a, then the processor leaves the entry 170h unchanged. This avoids the problem of having the same data displayed in both fields.

If the "GA" key 140 is pressed and a gestational age is not being displayed already, the processor updates the entry 170g to display in the first display field the gestational age in weeks (entry 170d). At the same time, the processor moves the prior contents of the entry 170g to the entry 170h so that the prior contents of the first display field 117a are displayed in the second display field 117b.

If the "GA" key 140 is pressed and a gestational age is being displayed already, then the processor toggles to the next gestational age entry. For example, if the gestational age in weeks (entry 170d) were being displayed in the second display field 117b, pressing the "GA" key 140 would result in the gestational age in months (entry 170e) being displayed in that field. Pressing the "GA" key 140 again would result in the gestational age in trimesters (entry 170f) being displayed in the second display field.

After updating the entries that identify the data to be displayed in the display fields 117 of the display 110 (step 440), the processor updates the display based on the data stored in the memory 160 (step 405) and waits for a new key entry (step 410).

Other embodiments are within the scope of the following claims. For example, a larger or higher resolution display could be provided to permit simultaneous display of more information to the user. Such a display could also be used to provide instructions or fetal development information to the user.

The calculator also could be configured to store information about multiple patients. With the calculator being configured in this manner, the health care professional could retrieve information for a particular patient by entering an identifier (e.g., a name or a patient number) for that patient.

What is claimed is:

1. A pocket-sized, electronic gestational calculator, comprising:

a housing sized and shaped to fit into a user's pocket, an input device connected to the housing and configured to produce signals in response to actuation of the input device by the user, wherein the input device is configured to produce signals corresponding to an initial date that corresponds to a first day of a mother-to-be's last menstrual period and includes a dedicated key corresponding to the initial date for use by the user in indicating that signals correspond to the initial date, an electronic processor positioned in the housing and configured to receive the signals from the input device and to process the signals to produce gestational information, and a display connected to the housing and configured to display the gestational information produced by the electronic processor.

2. The gestational calculator of claim 1, wherein the electronic processor is configured to determine the mother-to-be's expected due date based on the initial date and to produce the due date as the gestational information.

3. The gestational calculator of claim 1, wherein the input device includes numeric keys for use in identifying the initial date.

4. The gestational calculator of claim 2, wherein the input device is configured to produce signals corresponding to a current date and the electronic processor is configured to determine a gestational age based on the initial date and the current date and to produce the gestational age as the gestational information.

5. The gestational calculator of claim 4, wherein the electronic processor is configured to determine the gestational age in units of weeks.

6. The gestational calculator of claim 5, wherein the electronic processor is configured to determine the gestational age in units of months.

7. The gestational calculator of claim 6, wherein the electronic processor is configured to determine the gestational age in units of trimesters.

8. The gestational calculator of claim 4, wherein the input device includes a dedicated key corresponding to the current date for use in indicating that signals correspond to the current date.

9. The gestational calculator of claim 8, wherein the input device includes numeric keys for use in identifying the initial date and the current date.

10. The gestational calculator of claim 4, further comprising a memory positioned in the housing and configured to store the current date, the initial date, the expected due date, and the gestational age.

11. The gestational calculator of claim 1, wherein the input device is configured to produce signals corresponding to an expected due date and the electronic processor is configured to determine an initial date corresponding to a first day of a mother-to-be's last menstrual period based on the expected due date and to produce the initial date as the gestational information.

12. The gestational calculator of claim 11, wherein the input device includes a dedicated key corresponding to the expected due date for use in indicating that signals correspond to the expected due date.

13. The gestational calculator of claim 1, wherein the electronic processor is configured to determine the mother-to-be's expected due date and the gestational age.

14. The gestational calculator of claim 13, wherein the input device includes dedicated keys corresponding to the expected due date and to the gestational age, and the electronic processor is configured to cause the display to display the expected due date in response to actuation of the dedicated key corresponding to the expected due date and to display the gestational age in response to actuation of the dedicated key corresponding to the gestational age.

15. A pocket-sized, electronic gestational calculator, comprising:

a housing sized and shaped to fit into a user's pocket;

an input device connected to the housing and configured to produce signals in response to actuation of the input device by the user, the input device being configured to produce signals corresponding to an initial date that corresponds to a first day of a mother-to-be's last menstrual period and a current date, and including a dedicated key corresponding to the initial date for use by the user in indicating that signals correspond to the initial date;

an electronic processor positioned in the housing and configured to receive the signals from the input device and to process the signals to determine the mother-to-be's expected due date based on the initial date and a gestational age based on the initial date and the current date; and a display connected to the housing and configured to display the expected due date and the gestational age produced by the electronic processor.

16. The gestational calculator of claim 15, wherein the electronic processor is configured to determine the gestational age in units of weeks and months.

17. The gestational calculator of claim 15, wherein the input device includes a dedicated key corresponding to the current date for use in indicating that signals correspond to the current date.

18. The gestational calculator of claim 17, wherein the input device includes numeric keys for use in identifying the initial date and the current date.

19. The gestational calculator of claim 15, further comprising a memory positioned in the housing and configured to store the current date, the initial date, the expected due date, and the gestational age.

20. A pocket-sized, electronic gestational calculator, comprising:

a housing sized and shaped to fit into a user's pocket;

an input device connected to the housing and configured to produce signals in response to actuation of the input device by the user, wherein the input device is configured to produce signals corresponding to an initial date that corresponds to a first day of a mother-to-be's last menstrual period, and the input device includes:

a first dedicated key corresponding to the initial date for use by the user in indicating that signals correspond to the initial date, a second dedicated key corresponding to a current date for use in indicating that signals correspond to the current date, a third dedicated key corresponding to the expected due date, and numeric keys for use in identifying the initial date, the current date, and the expected due date;

an electronic processor positioned in the housing and configured to receive the signals from the input device and to process the signals to produce gestational information; and a display connected to the housing and configured to display the gestational information produced by the electronic processor.

* * * * *